United States Patent [19]

Aoki et al.

[11] Patent Number: 4,708,623

[45] Date of Patent: Nov. 24, 1987

[54] APPARATUS FOR PRODUCING ORGANIC FILLER-BLENDED RESIN COMPOSITIONS

[75] Inventors: Kazuo Aoki, Chibashi; Tsutomu Moteki, Sodegauramachi, both of Japan

[73] Assignee: Chisso Corporation, Osaka, Japan

[21] Appl. No.: 588,310

[22] Filed: Mar. 12, 1984

[30] Foreign Application Priority Data

Mar. 14, 1983 [JP] Japan .................................. 58-41748

[51] Int. Cl.$^4$ ....................... B29C 47/64; B29C 47/76
[52] U.S. Cl. ................................. 425/202; 264/177.2; 264/211.23; 264/328.18; 264/349; 366/81; 366/319; 425/203; 425/208
[58] Field of Search ............. 264/176 R, 328.18, 349, 264/177.2, 211.23; 366/79, 80, 81, 88, 89, 319; 425/202, 208, 209203, 205–207

[56] References Cited

U.S. PATENT DOCUMENTS

| | | | |
|---|---|---|---|
| 3,101,511 | 8/1963 | Heston | 366/81 |
| 3,235,640 | 2/1966 | Carton et al. | 264/102 |
| 3,751,015 | 8/1973 | Hensen et al. | 366/88 |
| 3,788,612 | 1/1974 | Dray | 425/208 |
| 3,788,614 | 1/1974 | Gregory | 366/88 |
| 3,797,550 | 3/1974 | Latinen | 425/203 |
| 4,136,969 | 1/1979 | Meyer | 425/208 |
| 4,415,514 | 11/1983 | Dorrestijn et al. | 425/209 |
| 4,616,989 | 10/1986 | Mewes et al. | 425/203 |

FOREIGN PATENT DOCUMENTS

| | | | |
|---|---|---|---|
| 2117997 | 10/1971 | Fed. Rep. of Germany | 425/208 |
| 54-119554 | 9/1979 | Japan | 425/203 |

*Primary Examiner*—Jeffery Thurlow
*Attorney, Agent, or Firm*—Fred Philpitt

[57] ABSTRACT

An improved process and apparatus for producing a uniform organic-filler-blended resin composition from a mixed material of a thermoplastic resin and a coarse organic filler raw material such as waste paper by the use of a specified extruder, without the necessity of fine-grinding of the organic filler raw material prior to feeding it into the extruder are provided, which process and apparatus are characterized by providing many projections and grooves surrounding them on the surface of an intermediate part of the screw in the extruder and specifying the size of the gap between the outer surface of the screw part and the inner surface of the cylinder opposed thereto.

4 Claims, 2 Drawing Figures

APPARATUS FOR PRODUCING ORGANIC FILLER-BLENDED RESIN COMPOSITIONS

BACKGROUND OF THE INVENTION

1. Field of the Invention

This invention relates to the production of thermoplastic resin compositions having organic fillers blended therein. More particularly, it relates to a process and an apparatus for producing resin compositions comprising a thermoplastic resin such as polypropylene and a fibrous organic filler blended therewith (which resin compositions will hereinafter be referred to as organic filler-blended resin compositions) suitable for molding interior materials for motorcars, building materials, appliances or other industrial materials, according to extrusion molding process.

2. Description of the Prior Art

As to organic filler-containing resin compositions, Japanese patent application laid-open Nos. Sho 56-34737 and Sho 57-115437 disclose in details a polyolefin resin composition consisting of a blend composed mainly of a polyolefin resin and vegetable fibers. The vegetable fibers used for the composition include finely-ground pulp, finely-ground waste paper such as newspaper, magazine, corrugated board, etc., finely-ground non-woven fabric, cotton cloth, etc., finely-ground wood chips, etc. The applications also discloses that as to the fiber length thereof, especially long fibers are undesirable and in order that the fibers are uniformly dispersed in polyolefin resin when blended with the resin, it is desirable that fine grinding be sufficiently carried out and interfibrous entanglements be freed; thus practically it is desirable that the fiber length be 300μ or less and the fiber diameter be 30μ or less. Further, Examples thereof illustrate a process for preparing pellets of vegetable filler-blended polyolefin resin, wherein the vegetable fibers and polyolefin resin and additives such as plasticizer, rosin, petroleum resin or inorganic filler, etc. are mixed in definite amounts and the mixture is kneaded on heating by a Banbury mixer, a kneader, or the like, followed by being introduced into an extruder when the resin in the mixture melts and begins to be impregnated into the vegetable fibers.

In this process, in order to improve the dispersibility of the mixture at the time of kneading, it is necessary to finely ground the vegetable fibers in advance, as described above. In order to effect this, it is necessary to roughly grind organic materials such as waste paper to a certain size once and then feeding them into a specified finely-grinding machine of e.g. turbo type to thereby finely grind them till a state is attained where the bonds and entanglements between the finely-divided fibers are freed. However, it is so difficult to handle thus finely-divided fibers that particular cares are required.

Namely, in view of the specific features of powder, the smaller the particle size in a storage tank or a feeding apparatus where how large its volume is, is important, the greater the porosity (a ratio of the total volume of interparticle spaces to the total volume of powder plus the volume of the interparticle spaces), and the lower the bulk density. This has been considered to occur because of the fact that in the case of finely-divided particles, interparticle adhesion increases, resulting in much larger clearances than the size of the particles at various parts within the powder layer. Further, in view of the adhesion, there is a tendency that the smaller the particle size, the larger the angle of repose. This phenomenon is one of the factors for the liability of occurrence of clogging of finely-divided particles at a discharge port and incapability of discharging the particles when a storage apparatus is provided during the process of transporting the particles, that is, a so-called bridge formation. Finely-ground vegetable fibers such as those disclosed in the above references are particularly strong in this tendency. Further, when the fibers and a thermoplastic resin in the form of pellets are mixed together and fed, notable differences of the particle sizes and the shapes of the both result in differences in bulk density, angle of repose, fluidity, etc. of the resulting material; thus the finely-ground fibers may separate from pellets at the feeding and discharging stage, that is, the so-called segregation phenomenon may occur.

These various phenomena which occur due to such factors originating from the finely-ground fibers, make it difficult or impossible to feed and discharge the material; thus the phenomena have a great influence upon the performance of the apparatus. Therefore, when an apparatus is designed, it is necessary to use a particular measures for preventing the above bridge formation and segregation phenomenon. Further, industrially complicated, various prior steps such as finely-grinding step, metering and transporting step, etc. for the vegetable fibers are also required. Thus such a manner has disadvantages that the initial cost increases and manpower is also required.

As another prior art directed to production of organic filler-containing resin composition, Japanese patent publication Nos. Sho 56-9576/1981 or Sho 57-43575/1982 discloses a process wherein vegetable fibers are not finely but roughly ground to a certain size and mixed, as they are, with a thermoplastic resin to produce a composite resin composition.

According to the prior art, a thermoplastic resin such as polyethylene, polypropylene, etc. is mixed with roughly-ground pieces obtained by chopping waste paper e.g. newspaper, corrugated board, compressed board paper, etc. to a size of about 5 mm×5 mm by means of a cutter or a turbo mill, and the mixture is introduced into a mixer heated in advance (practically a Henschel type mixer has been employed), followed by kneading through a high rate shear flow by means of agitation holes revolving in the mixer at a high rate. As the kneading advances, the temperature of the above mixed materials in the mixer rises due to the heat generated by friction and shear, the moisture of the waste paper vaporizes and the waste paper is dried. At the same time, the molten thermoplastic resin is impregnated into the waste paper, and beating of the paper is carried out in the resin-impregnated state. When the beating has advanced sufficiently, the revolving velocity of the mixer is reduced and the mixture is subjected to nucleus-creation at the initial period of granulation, followed by transferring it to a mixer cooled with water to about 20° C., and granulating under cooling at a low velocity revolution to obtain a thermoplastic resin composition having finely-divided vegetable fibers blended therein.

However, polyethylene and polypropylene resins have a nature of being degradated by oxidation when they are contacted with air in a heated, molten state. Thus, according to the above process for producing the resin compositions utilizing a heating and kneading mixer of high velocity shear flow type, the resin flows together with air flow caused in the mixer by its high velocity revolution during which the resin is brought into a molten state by generated heat, so that the resin temperature reaches 220° C. or higher; thus the resin is affected by oxygen in air and an oxidation reaction occurs within the resin itself which necessarily promotes degradation thereof.

According to the above process, nucleus-creation and granulation are carried out while the molten thermoplastic resins are impregnated into vegetable fibers, by the shear flow of the miser revolving at a high velocity; hence a flow variation within the mixer is liable to present a quality problem that compositional unhomogeneity of the mixture, the ununiformity of particle diameter, etc. occur partially in the mixture. Further, the extent of interparticle bonds and entanglements is so large that when roughly-ground pieces of waste paper, wood chips or the like are used, there is a drawback that fiber disentanglement by agitation flow of the mixer is not sufficiently carried out. Furthermore an operational problem is raised: since treatment is carried out in a mixer having a specified volume, the operation is batchwise and the treating time is long (46–47 minutes are required in the Examples); productivity does not increase and power saving is difficult.

Thus, in order to overcome the drawbacks of the above prior art, the present inventors pay attention to a process wherein a fiber-rich organic material in the form of roughly-ground small pieces and a thermoplastic resin are introduced together and directly into an extruder to subject the composition to extrusion molding, without a melt-kneading step in air atmosphere, as disclosed in Examples of the above Japanese patent publication No. Sho 56-9576/1981. However, in the case of monoaxial or biaxial screw type extruders which have so far been generally used for extrusion molding of thermoplastic resins, even if they have a sufficient kneading function for thermoplastic resins, it has been very difficult to uniformly disperse the above organic materials into the molten thermoplastic resin in the extruders to make it impossible to obtain a homogeneous composition. The cause has been considered to be in the following fact: in order to obtain a homogeneous, organic filler-blended resin composition, it is necessary for extruders to have a function of finely disentangling the bonds and entanglements of the fibers in the roughly-ground materials (which will hereinafter be abbreviated to fiber disentanglement), in the state where thermoplastic resin which has melted during the kneading process in the extruders is impregnated into roughly-ground organic fillers, but the above function is insufficient in the case of the screw form of conventional monoaxial or biaxial screw type extruders.

In order to solve the above-mentioned various problems, the present inventors have conducted extensive research on a new and functionally superior process for producing organic filler-blended resin composition and an extruder used therefor, unlike conventional process for producing the compositions by means of conventional types of extrusion molding or the above heating and kneading mixer, and as a result achieved the present invention.

SUMMARY OF THE INVENTION

The present invention resides in
(1) as a first aspect, a process for producing molded products of organic filler-blended resin compositions, which process comprises continuously feeding a thermoplastic resin and a fiber-rich, roughly-divided organic filler material into an extruder provided with a cylinder and a screw rotating therein, melting said thermoplastic resin in said extruder, passing said thermoplastic resin and said organic filler raw material through a fibers-disentangling and -kneading zone, formed between the outer surface of an intermediate part of said screw and the inner surface of a part of said cylinder correspondingly opposed to the former outer surface, said outer surface of the intermediate part of said screw having a number of projections and two groups of grooves surrounding said projections and having different directions to each other, relative to the line of intersection of said outer surface of the intermediate part of said screw and a plane containing the axis of said screw, and within said fibers-disentangling and kneading zone, said organic filler raw material being subjected to trituration-grinding; and (2) as a second aspect, in the extrusion apparatus provided with a cylinder and a screw rotating therein, and for extruding a thermoplastic resin and a fiber-rich, roughly-divided organic filler raw material, in the form of a resin composition having fibers-disentangled organic filler blended therein, an extrusion apparatus which comprises inside said cylinder, a fibers-disentangling and -kneading section provided between a section for feeding and plasticizing said resin and said raw material, succeeding from an inlet port for introducing these materials, and a section for metering and extruding said resin composition, succeeding to an exit port for extruding said resin composition; on the outer surface of said screw within said fibers-disentangling and -kneading section, a number of projections and two groups of grooves surrounding said projections and having different directions to each other, relative to the line of intersection of the outer surface of said screw and a plane containing the axis of said screw, being provided and between the outer peripheral surfaces of said projections and the inner peripheral surface of said cylinder opposed thereto, a distance enough to triturate said organic filler raw material being provided.

BRIEF DESCRIPTION OF THE INVENTION

A shows a material-feeding and -plasticizing section; M, a fiber-disentangling and -kneading section (main part); and B, an extruding and metering section. Numeral 5 shows a number of projections and 6, crossed grooves.

DETAILED DESCRIPTION OF THE INVENTION

Figure 1:
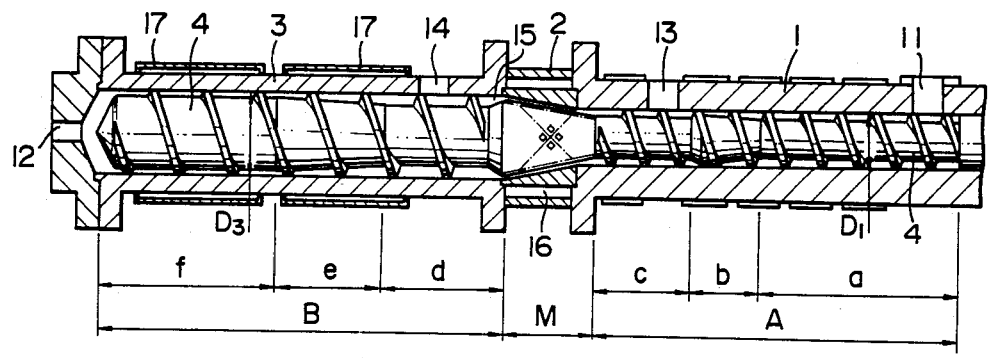
FIG. 1 shows a vertically cross-sectional view illustrating an embodiment of an extruder for producing an organic filler-blended resin composition of the present invention.
Figure 2:
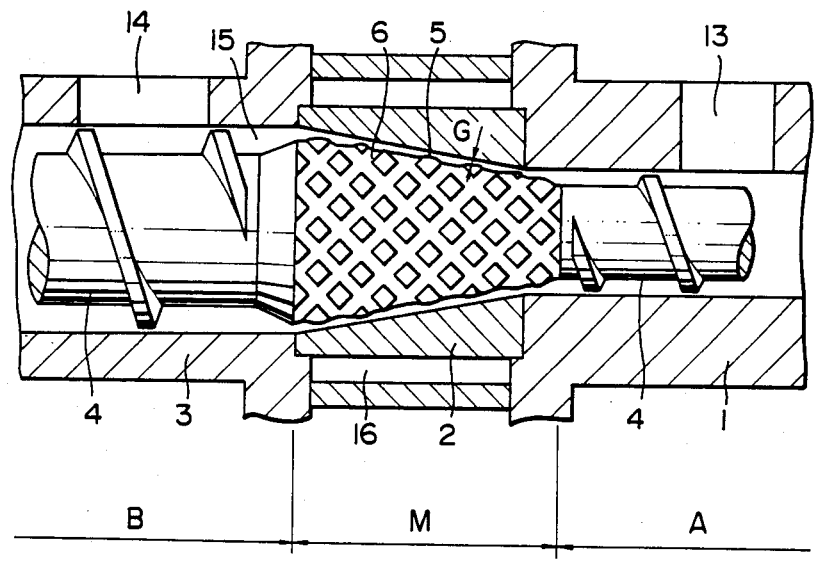
FIG. 2 shows a vertically cross-sectional view of an enlarged main part of FIG. 1.

The process and apparatus of the present invention will be concretely described referring to FIGS. 1 and 2 illustrating an embodiment of the present invention.

In FIG. 1, the extruder of the present invention is provided with coaxially connected cylinders 1, 2 and 3, into which connected cylinders a screw 4 constituting a part of a specific shape is inserted in freely rotatable manner, and the cylinders are also provided with a material-feeding port 11 near the base part (part of power input end) and an extrusion port 12 at the end part. At the base part of screw 4 are provided an input shaft for rotating the screws (not shown) and a means such as a hydraulic mechanism for forwarding or retreating the screw along the inner surfaces of the cylinders (not shown).

Screw 4 extends from a material-feeding and -plasticizing section A having the material introducing port 11, via a fibers-disentangling and -kneading section M to an extruding and metering section B, in this order.

In the material-feeding and -plasticizing section A, a mixed material of a thermoplastic resin (hereinafter abbreviated merely to resin) introduced through the material-introducing port 11, and an organic filler raw material, is heated to raise the temperature of the material to plasticize the resin, and at the same time the moisture contained in the organic filler is separated with the increase of the temperature to generate steam; thus the section A is provided with a degassing mechanism for primarily removing the steam to the outside. As to the shape of the screw in the section, a screw shape of single flight type which has generally been used for extrusion molding may be used. In the embodiment of FIG. 1, the section A comprises a material-introducing part (a) where the screw has a constant channel depth, a compression part (b) where it has a tapered channel and a primary degassing part (c) where it has an increased depth channel, for removing the contained moisture. The length of the section A is preferably 10 to 14 times the inner diameter $D_1$ of cylinder 1 in view of the retention time necessary for plasticizing the resin and removing the moisture, etc. The fiber-disentangling and -kneading section M is a main part in the present invention, which comprises a number of grooves 6 on the outer surface of the intermediate part of the screw of the section M and two groups of grooves surrounding the projections and having different directions to each other, relative to the intersection of the outer surface of the intermediate part of the screw and a plane containing the axis of the screw (the two groups of grooves being hereinafter abbreviated to crossed grooves 6). Such a number of projections 5 may have each a shape on the outer surfaces opposing to the inner wall of cylinder 2, of e.g. square, rectangle, rhombus, parallelogram, circle, ellipse or the like. Alternatively, the projections may have combinations of the foregoing shapes.

In the fibers-disentangling and -kneading section M, the crossed grooves 6 surround a number of projections 5 as described above, and may have a shape of vertically cross-sectional surface of semicircle, U-letter, trapezoid or the like. In an example of the arrangement of the crossed grooves 6, right-twisted grooves and left-twisted grooves relative to the generatrices of the peripheral surface of the screw shaft are combined, and the pitches of the respective grooves and the numbers of stripes thereof may be the same or different. Further the angles of twist of the grooves have no particular limitation. Still further the crossing manner of the grooves may be either of cross form or of T-letter form.

In the present invention, another of the preferred structural features of the fibers-disentangling and -kneading section M consists in that in order to more enhance the function of the section, such a structure is employed that the outer peripheral surface of a number of the projections 5 is varied in diameter along the direction of the screw shaft, and the inner surface of cylinder 2 corresponding thereto is also varied in diameter. Since a mechanism for forwarding and retreating the screw 4 is provided at the base part of the screw, as described above, when screw 4 is forwarded or retreated, a gap G (see FIG. 2) formed between the outer surface of projections 5 of the section M and the inner surface of cylinder 2 is broadened or narrowed, whereby it is possible to adjust the gap G to adequate sizes. The variation of the shape of the outer surface of the intermediate part may be a truncated cone, bell, a part of a bell, a stair-like pile of concentric disks, disk or combinations of the foregoing. In the case where drawing of the screw out of the extruder and in the direction of an extrusion port 12, as shown in FIG. 1, it is preferred that the diameter of the peripheral surface of the section M be enlarged toward the side of the extrusion port.

The length of the fibers-disentangling and -kneading section M is preferably about 1.5 to 3 times the inner diameter $D_1$ of cylinder 1 at the base part of the screw. The shape, depth, number, pitch, etc. of projections 5 and grooves 6 may be adequately choiced depending on the kind and blending proportion of thermoplastic resin and organic material used, the size of the extruder, etc. The size of the gap G formed between the outer surface of projections 5 and the inner surface of cylinder 2 corresponding thereto is preferred to set in the range of 0.5 to 1.5 mm, preferably 0.5 to 1.2 mm.

As for the extruding and metering section B, a screw of single flight type may be employed as in the case of the feeding and plasticizing section A, and the Section B comprises subsequently to the exit side of the fiber-disentangling and -kneading section M, a secondary degassing part d where the channel depth is increased to increase the flow path area, in order to secondarily discharge to the outside, the moisture and other volatile matters which are not discharged at the above primary degassing part c, and remaining in the materials; a compression part e where the channel depth is gradually reduced; and a metering part f where the channel depth is constant and shallow in order to stabilize the molten resin flow and send out it to extrusion port 12 at the end of cylinder 3. The length of the section B is preferably in the range of about 7.5 to 10 times the inner diameter $D_3$ of cylinder 3 in the section.

Next, the function of the extruder of the present invention constructed as above will be described.

In the initial step of the process of producing the organic filler-blended resin composition, while a thermoplastic resin and an organic filler raw material are mechanically and continuously metered in a specified proportion by weight, they are fed in the form of a mixed material into the extruder shown in FIG. 1. The thermoplastic resin used here, such as polyolefin resins e.g. polypropylene, polyethylene, ethylene/propylene copolymer, etc., other resins e.g. polyvinyl chloride, polystyrene, polyamides, ABS, etc. may be used alone or in admixture.

As the organic filler raw material, waste paper consisting of newspaper, corrugated board, Kraft paper, ends of cardboard or the like, wastes of timbers for building, chips of wood ends, cellulosic fiber-bonded materials such as rice hull, pulp, etc. may be used. As these organic filler raw materials, those obtained by finely-grinding or disentangling the materials as illustrated above, by means of a grinder, may be used, but as previously described, finely-ground fibers are difficult to handle in the transportation process, and grinding and feeding apparatus is often complicated and expensive; hence the organic filler raw material used in the present invention is preferred to be roughly-ground, rectangular pieces having a length in the longitudinal direction, of about 5 to 15 mm, obtained by grinding by means of a roughly-grinding machine.

The metering means in the process of feeding the resin and the organic filler in a specified proportion is not shown in the figures, but those which have generally been used as a metering feeder for plastic materials may be used. For example, an automatically metering and mixing apparatus or the like for mechanically metering raw material pellets and ground material and pigment, additives, etc. and feeding them to the molding machine may be used.

A mixed material of the resin and the organic filler fed in a specified proportion is introduced into cylinder 1 through material-feeding port 11 in the material-feeding and -plasticizing section A, and while the mixed material is sent from feeding part a to compression part b through revolution of screw 4, the temperature of the material rises through heating and the resin gradually begins to soften. Along with this, the moisture contained in the organic filler vaporizes in the form of steam with the increase of temperature. This steam is degassed by the function of reduced pressure brought about by the increase in the channel depth of the screw in the primary degassing part c, and is primary discharged to the outside through a vent 13 provided there. Since the resin at a high temperature in the degassing part is oxidized in contact with air, it is preferred that the degassing part be made air-tight and also, in order to further improve the degassing capacity, the vent 13 be connected to a vacuum pump or the like (not shown) and the degassing part be brought into a negative pressure state by its sucking action.

When the moisture contained in the organic filler vaporizes to a certain extent, the resin temperature rapidly rises and the melting rate of the resin becomes rapid. It is preferred that the material-feeding and -plasticizing section be sufficiently elongated and as the resin melting and plasticizing advance, the molten resin is impregnated into the organic filler and the organic filler be brought into a state where it is almost wet with the molten resin.

Thus, the molten resin and the organic filler raw material are sent from the materials-feeding and -plasticizing section A to the next fibers-disentangling and -kneading section M by the revolution of screw 4. Prior to the section M, the flow of the materials exhibits a helical flow relatively close to laminar flow in view of the regular helical shape of screw 4, but when the mixed material advances to the fibers-disentangling and -kneading section M, its flow is disturbed by a number of projections 5 and crossed grooves 6 in the section M; thus it is subjected to a turbulent flow and agitating action.

The flowing materials in the narrow gap part G formed between the outer peripheral surface of a number of projections 5 and the inner peripheral surface of cylinder 2 are subjected to a triturating and grinding action through a relative motion formed in the gap part so the interfibrous bonds and entanglements in the resin-impregnated organic filler are finely disentangled (disentangling function), and at the same time the molten resin is also subjected to a strong shearing force to promote kneading of the materials. Crossed grooves 6 surrounding a number of projections 5 consist of two groups of grooves having different directions to each other, relative to the line of intersection of the outer surface of screw 4 and a plane containing the screw axis, as described above; hence the flowing material at this part is partly subjected to a back-flow action. Thus, the mixed material exhibits a complicated, whirling flow mutually among a number of projections 5 and grooves 6 rotating along the inner surface of cylinder 2, and the material each other forcibly repeats division and fusion whereby it is subjected to an effective turbulent flow and agitating action.

The material is uniformly dispersed and made composite by the above triturating and grinding action and the above turbulent flow and agitating action in the fibers-disentangling and -kneading section M, and while it partly repeats back-flow and whirling flow, it, as a whole, advances along the grooves having the same direction as that of the flight of screw 4, and then it is sent to the next extruding and metering section B.

The materials-disentangling and -kneading effect and the material-sending capacity vary depending on the size of the gap C formed between the outer peripheral surface of a number of projections 5 and the inner surface of cylinder 2. Accordingly to the results of experiments carried out in accordance with the process of the present invention, when the size of the gap G was set to values in the range of 0.5 to 1.5 mm, preferably 0.5 to 1.2 mm, a desired fibers-disentangling and -kneading effectiveness and sending capacity were obtained.

If the size of the gap G is less than 0.5 mm, while the organic filler is subjected to a strong triturating and grinding action and very finely disentangled, the reduction in the size of the gap G increases the flow resistance of the material in the fibers-disentangling and -kneading section M to thereby reduce the material-sending capacity per one revolution of the screw and increase the retention time in the section, and on the other hand, since the friction heat and the shearing heat of the material generated at that time increase, the material temperature is liable to notably rise. The cellulosic fibers as the main component of the organic filler are liable to degradate by heating, and particularly when the temperature exceeds 200° C., the fibers cause carbonization or thermal decomposition to reduce the physical properties of the resulting organic filler-blended resin composition; hence the material temperature measured at exit part 15 of the fibers-disentangling and -kneading section M is preferred to be kept at 200° C. or lower, preferably 195° C. or lower. In order to prevent the rise of the material temperature due to this generated heat, cylinder 2 in the section M is provided with a cooling jacket 16 which can be used also for heating, through which hot water or another cooling medium is passed to thereby forcibly cool the material for heat removal, whereby the material temperature in the section M is controlled to 200° C. or lower. However, if the size of gap G is less than 0.5 mm as described above, the quantity of generated heat of the material itself becomes so large that the quantity of heat removed through cooling jacket 16 is insufficient for compensating the above quantity of generated heat; hence it is difficult to control the material temperature measured at exit part 15 of the section M to 200°

C. or lower. Thus it is undesirable to make the size of gap G in the section M less than 0.5 mm.

Contrary to the foregoing, if the size of gap G is greater than 1.5 mm, the flow resistance of the material decreases and the material-sending capacity per one revolution of the screw increases. Further, when the size of gap G is increased, the shearing force acting on the material in gap G is notably reduced; hence the quantity of heat generated by the friction and shear of the material itself is small. On the other hand, however, since the triturating and grinding action in the gap G is reduced, the organic filler is often sent to the extruding and metering section B and extruded therefrom in a state wherein the filler is incorporated into the molten resin in the form of coarse particles as they are, almost without being disentangled. In this case, a structure wherein the resin and fine fibers are uniformly mixed together is not obtained, but a very brittle molded product is obtained. Thus it is undesirable to set the size of gap G to values larger than 1.5 mm.

As described above, in the fibers-disentangling and -kneading section M, the organic filler-disentangling performance and the material-sending performance are in a functionally contrary relation to each other, but when the size of gap G in the section M is set to values in an adequate range, there is obtained an optimum condition where the organic filler-disentangling performance is consistent with the material-sending performance.

As described above, the moisture and other volatile matters contained in the organic filler are primarily discharged at the primary vent 13, but they are not totally discharged there, and the material is sent via the fibers-disentangling and -kneading section M to the extruding and metering section B in a state where a portion of the moisture and other volatile matters are remaining in the material. In order to improve the quality and the extrusion stability of the composite resin composition, it is preferred to remove the moisture and other volatile matters contained in the material as much as possible; hence the remaining moisture and other volatile matters are secondarily discharged to the outside through a vent 14 provided in the cylinder 3 by suction by means of a vacuum pump or the like (not shown) at a secondary degassing part d provided at the introducing part of the extruding and metering section B subsequent to the fibers-disentangling and -kneading section M. Thus, since almost all of the moisture and other volatile matters are removed, it is possible to obtain a composite resin composition having a stabilized quality.

Successively, the molten material is again compressed at a compression part e and then led to a metering part f having a shallow channel where the material flow is converted to a stabilized flow, and extruded through an extrusion port 12 provided at the end of cylinder 3.

The temperature of the blended resin composition to be extruded from extrusion port 12 is preferred in respect of quality to be kept at 200° C. or lower, as described above. Thus, it is preferred to provide on the cylinder 3, a cooling jacket 17 which is also useful for heating, and to forcibly cool the cylinder 3 by hot water or another cooling medium passed through the jacket 17.

If a multi-orifice die and a hot-cut means or another cutting means is attached successively to extrusion port 12, it is possible to produce pellets of the organic filler-blended composition. Further if T-die or a profile die is attached in place of the above means and a cooling and taking up means or a sizing means corresponding thereto is provided, it is possible to continuously produce an organic filler-blended resin sheet or a profile shape product or other molded products.

As a result of various experiments directed to the component proportion of the organic filler-blended resin composition according to the present invention, it has been possible to blend the organic filler in an amount of up to 75% by weight relative to 25% by weight of the thermoplastic resin.

When the extruder of the present invention having the above structure is used, it is readily possible to introduce a resin composition having an organic filler blended with a thermoplastic resin such as polypropylene, polyethylene, etc. as raw materials, directly into the extruder and uniformly disperse and knead the composition, without needing any primary kneading process by means of e.g. a heating-kneading mixer, a kneader or the like. Thus the process of the present invention is very effective for extrusion-molding organic filler-blended resin compositions. Further, the screw having a fiber-disentangling and -kneading section of the present invention has also an effect of triturating and grinding a roughly-ground material in the form of chips in the section, to thereby finely disentangle it; hence waste paper, timber chips or the like used as the organic filler need not be necessarily finely ground. Thus since an industrially complicated finely-grinding process and a related apparatus are omitted, the present invention is very advantageous in respect of process and apparatus.

In the present invention, it is preferred to roughly grind the organic filler used therein to a size of about 5 to 15 mm in the longitudinal direction, as described above, but it is also possible to use finely-ground organic fillers or finely-divided fiber wastes or generally used fillers other than vegetable fibers such as glass fiber, talc, calcium carbonate or the like and produce thermoplastic resin compositions having them blended therein.

The organic filler-blended resin compositions produced according to the present invention are effective as new stocks of resources-saving, energy-saving and low cost since waste paper or industrial wastes such as timber chips, rice hull, etc. are utilized as the filler materials to be used in the compositions. Further the compositions are superior to those derived from inorganic fillers, in dimensional stability and further, rigidity, affinity to paint adhesive property, heat insulating properties, nail-holding property, acoustic properties, etc.; hence it is possible to provide the compositions as molding materials in broad application fields such as parts of autocars, parts of appliances, parts of acoustic products, building materials, etc.

Production of organic filler-blended resin compositions according to the present invention will be described by way of Examples.

EXAMPLE 1

In the extruder shown in FIG. 1, dimensions of each parts are as follows:
the inner diameter $D_1$ of cylinder 1 at its base part in the material-feeding and plasticizing section A:
   70 mm, and
the length of section A:
   13 times the inner diameter $D_1$.

In the section A,
the length of the material-introducing part a:
490 mm,
the channel depth in this part a:
12 mm,
the length of the compression part b:
210 mm,
the length of the primary degassing part c:
210 mm, and
the channel depth in this part c:
13 mm;
the length of the fiber-disentangling and -kneading section M:
140 mm,
the shape of the surface of a number of projections 5 in the section M, opposed to the cylinder:
rhombus of one side: 10 mm,
the crossed grooves 6 surrounding the projections:
provided at intervals of equal pitch, the cross-sectional shape of the grooves 6 being of a semi-ellipse having a width of 12 mm and a depth of 4 mm, the angles of two groups of grooves against the line of intersection of the outer surface of the screw and a plane containing the screw axis being 27° and −27°, respectively.
the shape of the diameter in the section M:
a truncated cone enlarged in the diameter at a definite angle toward the end of the extruder, and
the size of gap G formed between the outer surface of projections 5 and the inner surface of cylinder 2:
0.8 mm.
In the extruding and metering section B,
the inner diameter $D_3$ of cylinder 3:
90 mm,
the total length of the section B:
990 mm,
the length of the secondary degassing part d in the section B:
360 mm,
the channel depth in the part d:
10 mm,
the length of the compression part e in the section B:
180 mm,
the length of the metering part f:
450 mm, and
the channel depth in the part f:
3.5 mm.

Onto the extrusion port 12 at the end of cylinder 3 was fixed a multi-orifice die having 16 orifices of 4 mm in the diameter, to which die a hot cut means was attached.

Into the material-feeding port 11 of the extruder as designed above was fed by means of an automatic metering and mixing means, a mixed material obtained by blending an ethylene-propylene random copolymer of a melt flow rate of 4 g/10 min. (Chisso Polypro XF 2345 manufactured by Chisso Corporation) (50% by weight) with pieces of corrugated board roughly ground to about 5 to 8 mm in the length of one side (50% by weight; in dry state). The extruder was operated at a revolution per minute of screw 4 of 90. At that time, the set temperature of cylinders 1, 2 and 3 were all 180° C. and hot water having the temperature adjusted to 60° C. was used as a cooling medium for cylinders 2 and 3. To the respective vents 13 and 14 was connected a water-seal type vacuum pump to suck and vent the moisture and other volatile matters contained in the material.

As a result, the material temperature at the exit part 15 of the fibers-disentangling and -kneading section M was 190° C.–194° C., the temperature at the extrusion port 12 was 192° C.–194° C., and the blended resin consisting of the propylene copolymer resin and the disentangled material from pieces of corrugated board, showed almost no sign of fuming nor smelling and a whitish, light brown color appearance that is, there was no sign of so-called "burning". This blended resin was cut by a hot cut means attached to the exit of the multi-orifice die whereby it was possible to produce pellets in the form of columnar particles of about 4.5 mm in diameter and about 3 mm long, continuously and in stabilized manner at a rate of 58 Kg/hr. of throughput.

When the pellets of the resin composition was compression-molded by means of a heating press, into a film form product having a thickness of 0.1 mm or less and the aspect of the product was viewed through, it was observed that the organic filler did not appear to locally agglomerate, but were dispersed in average in a finely disentangled state. Further when the pellets of the composition were injection-molded into a plate form product of 3 mm thick and its cross-sectional surface was viewed through a microscope, there was observed a state where the crystalline material of the polypropylene resin and finely disentangled cellulosic fibers were uniformly entangled with each other.

COMPARATIVE EXAMPLE 1

Example 1 was repeated except that the size of gap G formed between the outer surface of a number of projections 5 and the inner surface of cylinder 2 in the fibers-disentangling and -kneading section M as shown in FIG. 2 was set to 0.3 mm.

As a result, the material temperature at the exit part 15 of the fiber-disentangling and -kneading section M exceeded 220° C., and the resin composition extruded from extrusion port 12 was accompanied with fuming, paper-scorching-like smelling and exhibited a blackish, burning color. Further, due to the reduction in the size of gap G, the flow resistance of the material in the section increased; thus the amount of the material sent in the section M notably decreased as compared with that in Example 1, the material caused the so-called "leakage" from the primary vent 13, the amount of the blended resin extruded from the extrusion port 12 lowered down to about 25 kg/hr of throughput and a surge phenomenon occurred.

EXAMPLE 2

Using the same extruder and multi-orifice die as shown in Example 1, the size of the gap G formed between the outer surface of a number of projections 5 and the inner surface of cylinder 2 was set to 1.2 mm.

Into this extruder was fed a mixed material having an ethylene-propylene block copolymer of a melt flow rate of 2.5 g/10 min. (Chisso Polypro XF 1323 manufactured by Chisso Corporation) (50% by weight) and calcium carbonate (10% by weight) blended with chips of ends of rubber tree from Malaysia (the shape of each chip: a rectangular parallelopiped of 2–6 mm wide, 1–2 mm thick and 8–15 mm long) (40% by weight), followed by extruding the the material under conditions of a r.p.m. of the screw of 90 and a set cylinder temperature of 180° C., whereby it was possible to produce a resin composition having similar temperature and appearance to those in Example 1, continuously over a long time at a rate of 62 Kg/hr.

The cross-sectional surface of a molded product from pellets of the above composite resin composition was observed through a microscope and the same state was found as in Example 1. Further, when the pellets were compression-molded by means of a heating press into a film form product having a thickness of 0.1 mm or less and its appearance was observed by naked eyes there was no appearance of partial agglomeration of the woody tissues. They showed almost uniform dispersion.

COMPARATIVE EXAMPLE 2

Example 2 was repeated except that the size of the gap G in the fiber-disentangling and -kneading section M was set to 1.8 mm.

As a result, the resin temperature at the extrusion port 12 was lower than 190° C. and the extruded amount also increased by about 15–20% as compared with that in Example 2, but the chips of the rubber tree were ground only to a small size and almost not disentangled, and the appearance of the resin extruded from a multi-orifice die attached to extrusion port 12 was in the state where it was clearly seen that woody coarse particles having apparently different sizes were mixed in a large amount in the polypropylene resin.

Subsequently, definite test pieces prepared from the resin compositions obtained in Example 1 and 2 and Comparative example 1 and 2 were subjected to measurement of their physical properties. The results are shown in the following Table 1.

TABLE 1

| Physical properties measured | | Example 1 | Compar. ex. 1 | Example 2 | Compar. ex. 2 | Measurement method JIS |
| --- | --- | --- | --- | --- | --- | --- |
| Item | Unit | | | | | |
| Density | g/cm$^3$ | 1.04 | 1.01 | 1.12 | 1.13 | K7112 |
| Tensile strength | Kg/cm$^2$ | 230 | 198 | 220 | 178 | K7113 |
| Elongation | % | 8 | 2 | 12 | 3 | K7113 |
| Bending modulus | × 10$^4$ Kg/cm$^2$ | 2.6 | 2.0 | 2.3 | 1.8 | K7203 |
| Izod impact strength | Kg-cm/cm | 4.5 | 2.2 | 5.3 | 2.5 | K7110 |
| Heat distortion temperature | °C. | 132 | 123 | 127 | 115 | K7207 |
| Percentage molding shrinkage | % | 0.53 | 0.85 | 0.76 | 0.99 | (observed) |
| Burning odor of filler | | very few | much | very few | none | |
| Dispersed and disentangled state of filler | | good | good | good | bad | *1 |
| Processability of sheet | | good | bad | good | bad | *2 |

*1 Film molded by heating press was observed by view-through and a microscope.
*2 Sheet was prepared by extrusion-molding and its vacuum-molding properties were tested.

As seen from the results of Table 1, when an extruder is used wherein the size of the gap between the outer peripheral surface of the screw and the inner surface of the cylinder is set to values in a specified range, preperable results were obtained for the disentanglement and dispersing of a roughly-ground material of organic filler heated and kneaded together with a thermoplastic resin, and thus an excellent process has been established for producing an organic filler-blended resin composition having superior physical properties.

What we claim is:

1. An apparatus for receiving and extruding an admixture of a thermoplastic resin and a fiber-rich, roughly-divided organic filler raw material which comprises
    (a) a first material feeding and plasticizing section that is composed of an elongated cylinder and a screw that is adapted to rotate within the cylinder so as to leave a gap distance therebetween,
    (b) an inlet to said first section for introducing said resin and said filler,
    (c) a fibers-disentangling and kneading second section following said first section,
    (d) an extruding and metering third section that follows said second section, said third section including an elongated cylinder and a screw that is adapted to rotate therein so as to leave a gap distance therebetween,
    (e) an outlet for extrudate from said third section,
    (f) a vent outlet located in said first section at a point between the inlet set forth in (b) and the point where said first section joins said second section, and
    (g) a vent outlet located in said third section at a point between the outlet set forth in (e) and the point where said third section joins said second section, said second section comprising
        (1) a central rotatable member that has a frusto-conical configuration, the smaller end of said frusto-conical member being joined to the end of said first section and the larger end of said frusto-conical member being joined to the inlet end of the screw of said third section, the outer surface of said frustro-conical member being provided with a plurality of separate spaced apart projections which are surrounded by and defined by two groups of grooves that extend in planes that intersect each other at an angle, and
        (2) an annular frustro-conical wall section surrounding said central frustro-conical member and being spaced outwardly from the outer peripheral surface of said projections by a gap distance of 0.5 to 1.5 mm.
2. An apparatus according to claim 1 wherein in (1) the grooves of one group are in planes that are at right angles to the planes of the other group of grooves.
3. An apparatus according to claim 1 wherein in (2) the gap distance is 0.5–1.2 mm.
4. An apparatus according to claim 2 wherein in (2) the gap distance is 0.5–1.2 mm.

* * * * *